US012696238B2

(12) United States Patent 
Abedini et al.

(10) Patent No.: US 12,696,238 B2 
(45) Date of Patent: Jul. 28, 2026

(54) BEAM-SPECIFIC PAGING

(71) Applicant: QUALCOMM Incorporated, San Diego, CA (US)

(72) Inventors: Navid Abedini, Basking Ridge, NJ (US); Naeem Akl, Bridgewater, NJ (US); Sherif Elazzouni, San Diego, CA (US); Linhai He, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 289 days.

(21) Appl. No.: 18/402,019

(22) Filed: Jan. 2, 2024

(65) Prior Publication Data

US 2024/0381312 A1     Nov. 14, 2024

Related U.S. Application Data

(60) Provisional application No. 63/501,576, filed on May 11, 2023.

(51) Int. Cl.
 *H04W 68/02* (2009.01)
 *H04W 16/28* (2009.01)
(52) U.S. Cl.
 CPC ................................... *H04W 68/02* (2013.01)
(58) Field of Classification Search
 CPC ...................................................... H04W 68/02

USPC .......................................................... 455/458 
See application file for complete search history.

(56) References Cited

U.S. PATENT DOCUMENTS

| | | | | |
|---|---|---|---|---|
| 9,854,513 | B2* | 12/2017 | Wang .................... | H04W 48/12 |
| 2010/0323612 | A1* | 12/2010 | Xu ......................... | H04L 5/0051 |
| | | | | 455/7 |
| 2014/0293971 | A1* | 10/2014 | Yoo ...................... | H04W 72/54 |
| | | | | 370/336 |
| 2016/0212680 | A1* | 7/2016 | Talukdar ............. | H04W 36/305 |
| 2018/0242276 | A1* | 8/2018 | Patel ...................... | H04W 16/14 |
| 2019/0229789 | A1* | 7/2019 | Zhang ................... | H04L 27/261 |
| 2021/0360579 | A1* | 11/2021 | Sakhnini .............. | H04W 68/04 |
| 2022/0022160 | A1* | 1/2022 | Zhang ................... | H04W 68/02 |
| 2024/0031984 | A1* | 1/2024 | Li ......................... | H04J 11/0076 |

* cited by examiner

*Primary Examiner* — Mark G. Pannell 
(74) *Attorney, Agent, or Firm* — Dinsmore & Shohl LLP

(57) ABSTRACT

Various aspects of the present disclosure generally relate to wireless communication. In some aspects, a user equipment (UE) may receive downlink assistance information relating to beam-specific paging. The UE may transmit uplink assistance information relating to the beam-specific paging. The UE may monitor for a paging message on one or more beams in accordance with at least one of the downlink assistance information or the uplink assistance information. Numerous other aspects are described.

30 Claims, 10 Drawing Sheets

700 ——▶

710 ⌇ Receive downlink assistance information relating to beam-specific paging

720 ⌇ Transmit uplink assistance information relating to the beam-specific paging 730 ⌇ Monitor for a paging message on one or more beams in accordance with at least one of the downlink assistance information or the uplink assistance information

700

710 — Receive downlink assistance information relating to beam-specific paging

720 — Transmit uplink assistance information relating to the beam-specific paging 730 — Monitor for a paging message on one or more beams in accordance with at least one of the downlink assistance information or the uplink assistance information

800

810　Transmit downlink assistance information relating to beam-specific paging

820　Receive, from a user equipment (UE), uplink assistance information relating to the beam-specific paging 830　Output a paging message on one or more beams in accordance with at least one of the downlink assistance information or the uplink assistance information

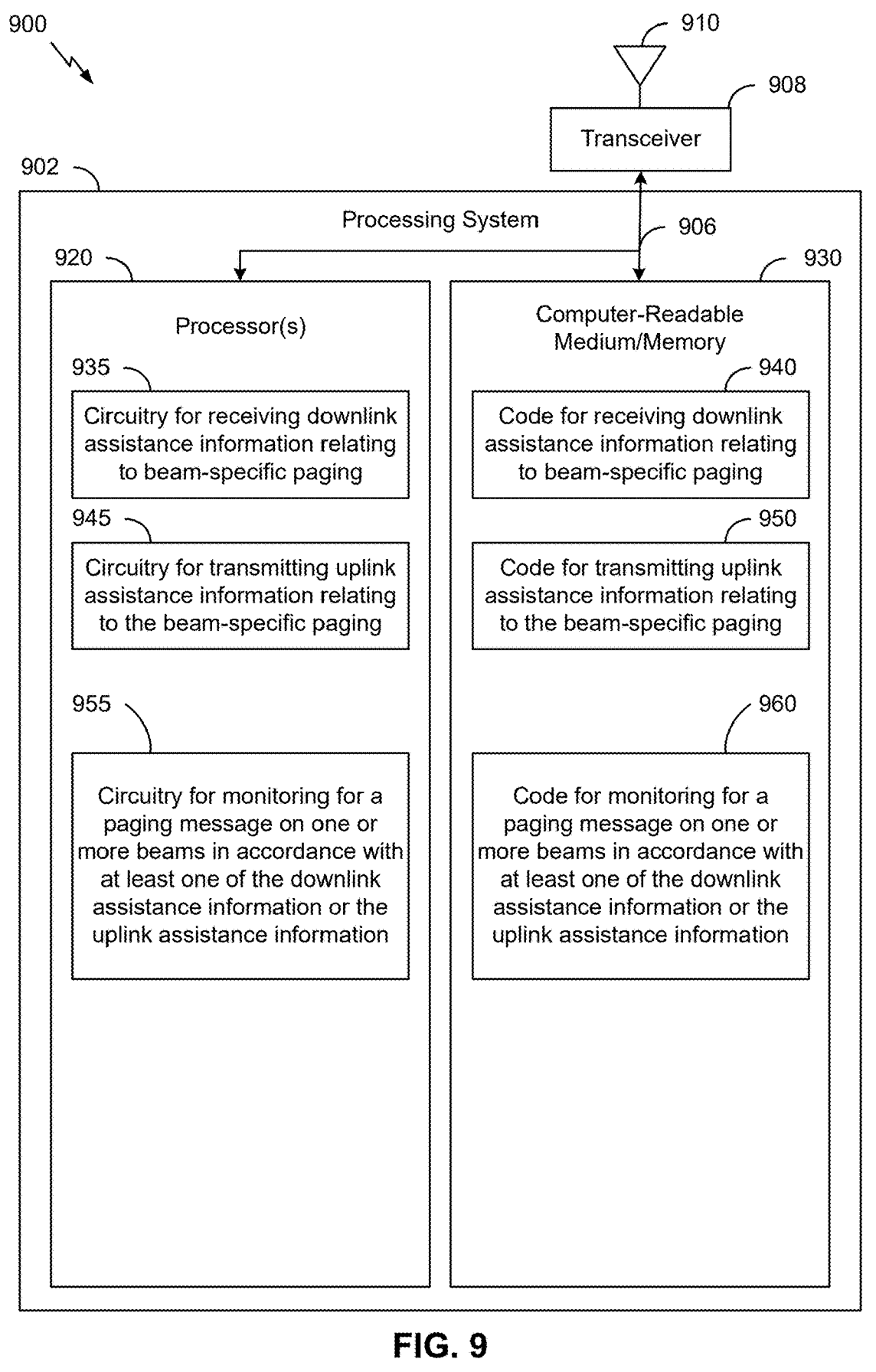

900

910

908

Transceiver

902

Processing System

906

920

930

Processor(s)

Computer-Readable
Medium/Memory

935

940

Circuitry for receiving downlink
assistance information relating
to beam-specific paging Code for receiving downlink
assistance information relating
to beam-specific paging

945

950

Circuitry for transmitting uplink
assistance information relating
to the beam-specific paging Code for transmitting uplink
assistance information relating
to the beam-specific paging

955

960

Circuitry for monitoring for a
paging message on one or
more beams in accordance with
at least one of the downlink
assistance information or the
uplink assistance information Code for monitoring for a
paging message on one or
more beams in accordance with
at least one of the downlink
assistance information or the
uplink assistance information

FIG. 9

BEAM-SPECIFIC PAGING

CROSS-REFERENCE TO RELATED APPLICATION

This Patent Applications claims priority to U.S. Provisional Patent Application No. 63/501,576, filed on May 11, 2023, entitled "BEAM-SPECIFIC PAGING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam-specific paging.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a user equipment (UE). The method may include receiving downlink assistance information relating to beam-specific paging. The method may include transmitting uplink assistance information relating to the beam-specific paging. The method may include monitoring for a paging message on one or more beams in accordance with at least one of the downlink assistance information or the uplink assistance information.

Some aspects described herein relate to a method of wireless communication performed by a network entity. The method may include transmitting downlink assistance information relating to beam-specific paging. The method may include receiving, from a UE, uplink assistance information relating to the beam-specific paging. The method may include outputting a paging message on one or more beams in accordance with at least one of the downlink assistance information or the uplink assistance information.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example of an implementation of code and circuitry for a communications device, in accordance with the present disclosure.

DETAILED DESCRIPTION

Figure 1:
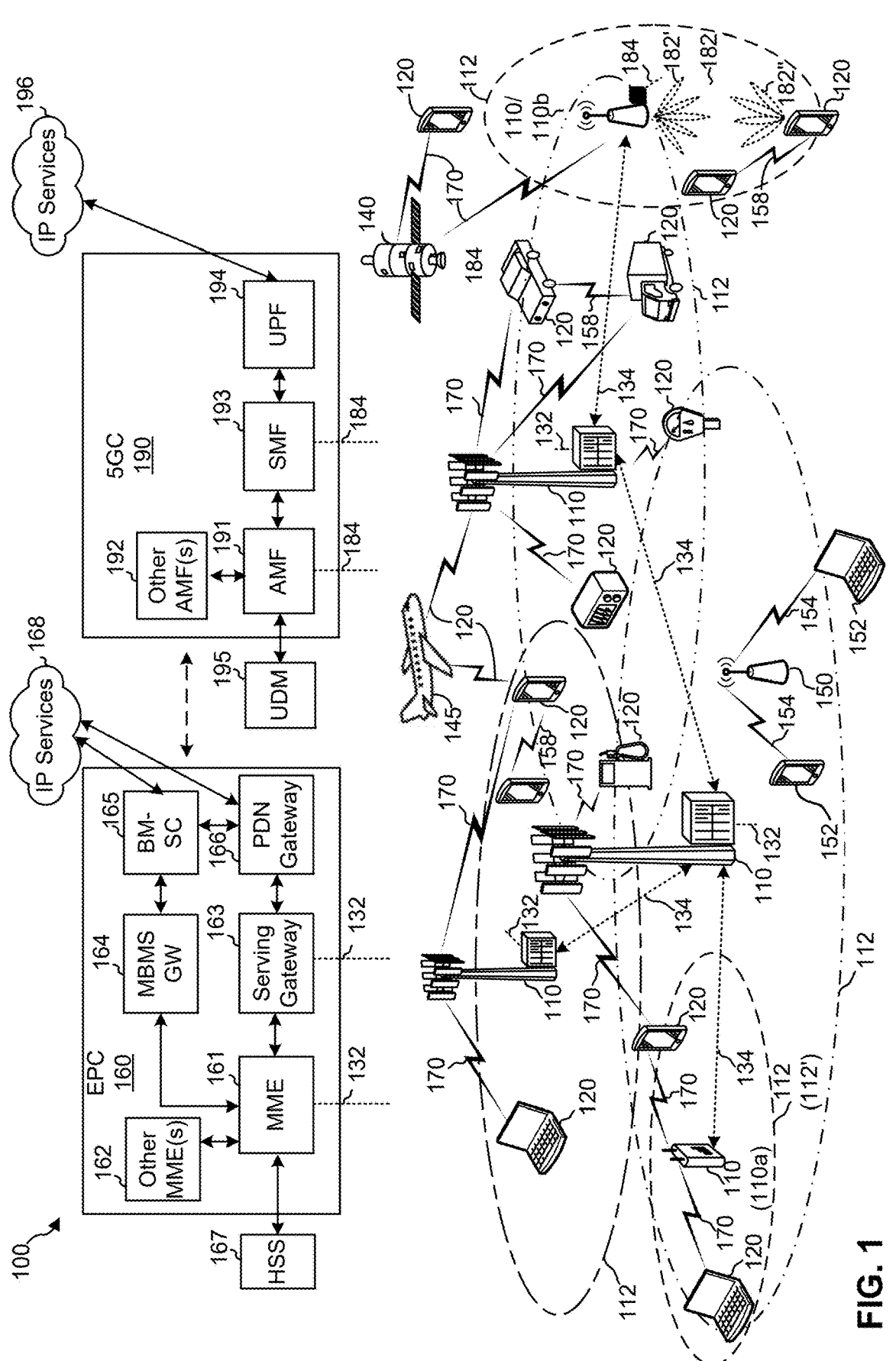
FIG. 1 depicts an example of a wireless communications network, in accordance with the present disclosure.

Aspects of the present disclosure provide apparatuses, methods, processing systems, and computer-readable mediums for beam-specific paging.

A network entity may utilize paging for various purposes, such as to trigger a user equipment (UE) to request service and establish a connection with the network entity. Paging may occur via a paging message. A paging message is transmitted on a paging occasion, which may occur periodically in accordance with a paging cycle. Paging may be directed to a tracking area, which may be associated with a number of cells. If paging is directed to the tracking area, a network entity may transmit a paging message to each cell associated with the tracking area. In some examples, paging may be directed to a sub-group of UEs within a paging area. A paging early indication may indicate which UEs belong to the sub-group or may indicate the sub-group. Paging can originate at the core network (referred to as core network paging or radio resource control (RRC) idle mode paging) or at the radio access network (RAN) (referred to as RAN-initiated paging).

Some network entities utilize beamforming. When a network entity that supports beamforming transmits a paging message, the network entity may transmit the paging message on a number of beams (e.g., using beamsweeping). This may assist a UE in receiving the paging message, since the UE may have moved from the coverage area of one beam to the coverage area of a different beam since the UE was last paged or last communicated with the network entity.

Network energy savings (NES) involves the implementation of "green network" operations or configurations such that energy consumption of the RAN is reduced. One area of interest for NES is energy reduction in connection with paging. For example, paging may be restricted to a limited area (as compared to paging an entire tracking area or a full set of beams). In this example, a network entity may page a subset of beams or cells of a full set of beams or a tracking area, thereby reducing power consumption associated with transmitting a larger number of paging messages. The subset of beams or cells may be identified as a set of recommended beams or cells (e.g., a recommended paging synchronization signal block (SSB) list, a set of recommended cells, or a list of recommended beams). The paging of the subset of beams or cells may be referred to herein as beam-specific paging. Beam-specific paging may be particularly beneficial for stationary UEs since such UEs are likely to be covered by the same beam (or the same subset of beams) for a long period of time.

Various challenges may arise in the context of beam-specific paging (e.g., in the context of NES). For example, signaling of a set of recommended beams (or restricted beams) by a UE or network entity, regarding a single cell, may provide limited benefit if the UE is located at a cell edge, since the UE may be likely to move into an area uncovered by a subset of beams (e.g., corresponding to the set of recommended beams), thereby reducing the efficacy of beam-specific paging. As another example, beam-specific paging may have limited benefit for a UE that will start moving within a threshold length of time, since such a UE may move out of the coverage area of a subset of beams. As yet another example, if a UE provides a set of recommended beams without any guidance as to how to select such beams, the energy savings at the network entity may be limited, for example, because the UE's recommended beams may not be configured in a fashion to reduce energy consumption at the network entity. As another example, some UEs may be capable of receiving paging using beam-specific paging, whereas other UEs may be incapable of receiving such paging (for example, due to the incapable UEs performing receive combining across beams). If the network entity indiscriminately uses beam-specific paging, such incapable UEs may fail to receive the paging, causing a fallback to traditional paging, increased energy consumption, and delay before receiving paging.

Various aspects relate to signaling of assistance information associated with paging area reduction. In some examples, a UE may receive downlink assistance information relating to beam-specific paging. The UE may transmit uplink assistance information relating to beam-specific paging. In various examples, this downlink and uplink assistance information may relate to beam-specific paging in various ways, described below. The UE may monitor for paging on one or more beams in accordance with at least one of the downlink assistance information or the uplink assistance information. For example, the uplink assistance information (or backhaul assistance information) may indicate a set of recommended beams relating to multiple cells, such as for a cell-edge UE. As another example, the uplink assistance information may indicate that the UE will begin moving within a threshold length of time, and thus may include an indication to disable the beam-specific paging. As another example, the downlink assistance information may indicate a criterion for identifying recommended beams or restricted beams for the beam-specific paging. As another example, the network entity may selectively perform beam-specific paging according to whether a recipient UE is stationary or supports the beam-specific paging.

Particular aspects of the subject matter described in this disclosure can be implemented to realize one or more of the following potential advantages. In some examples, by indicating a set of recommended beams relating to multiple cells, such as for a cell-edge UE, the described techniques can be used to improve the efficacy of beam-specific paging for cell-edge UEs. In some examples, by indicating that the UE will begin moving within a threshold length of time, the described techniques can be used to deactivate beam-specific paging when appropriate, thereby reducing delay associated with failed paging. In some examples, by indicating a criterion for identifying recommended beams or restricted beams for the beam-specific paging, suitability of recommended beams may be improved, which reduces network energy consumption. As another example, by selectively performing beam-specific paging according to whether a recipient UE is stationary or supports the beam-specific paging, incapable UEs may be properly paged, avoiding a fallback procedure and thereby reducing energy consumption and delay.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
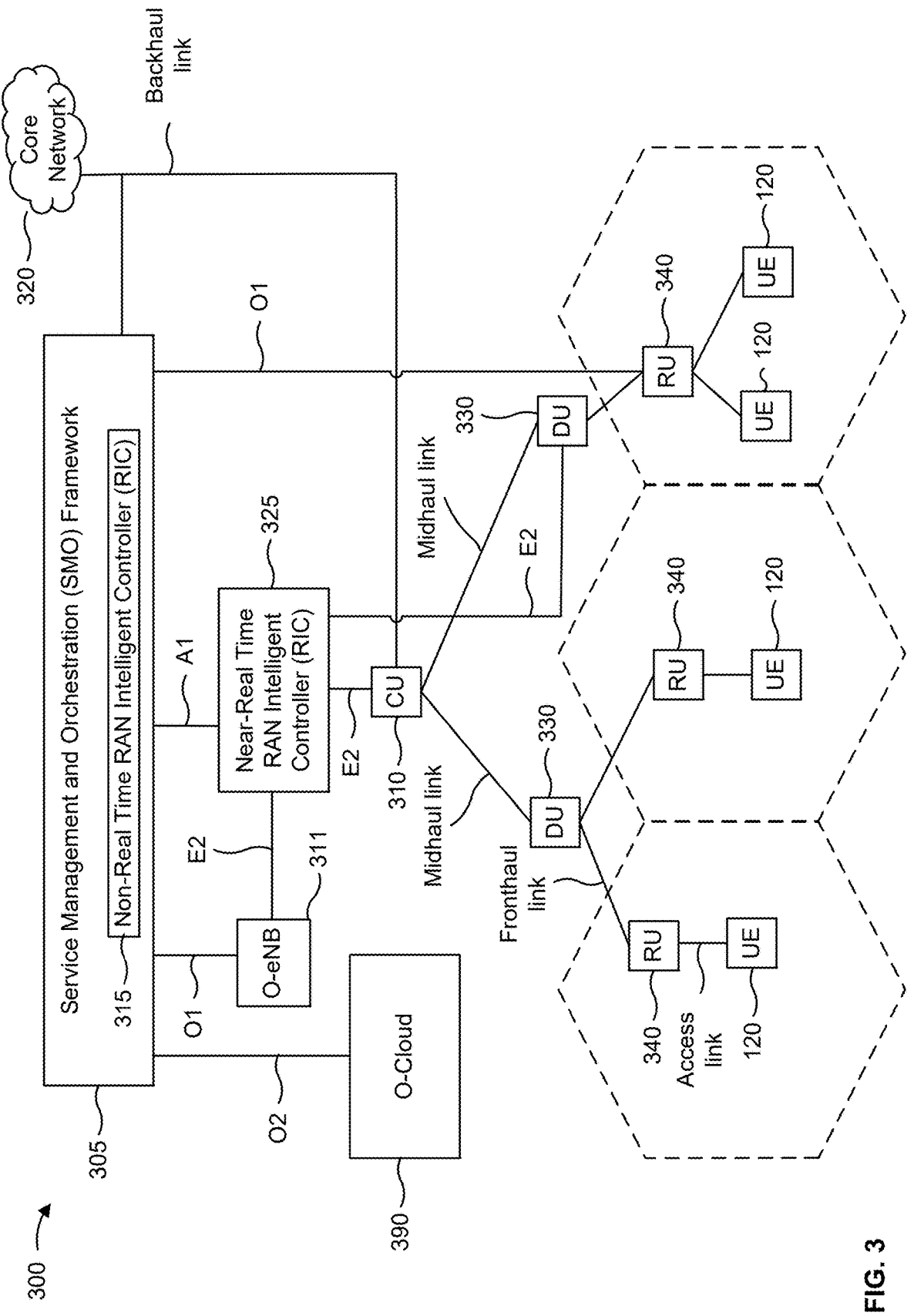
FIG. 3 depicts an example disaggregated base station architecture, in accordance with the present disclosure.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT)

radio access network (RAN) Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated RAN architecture, such as an Open RAN (O-RAN) architecture or a Virtualized RAN (vRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, the 3rd Generation Partnership Project (3GPP) currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
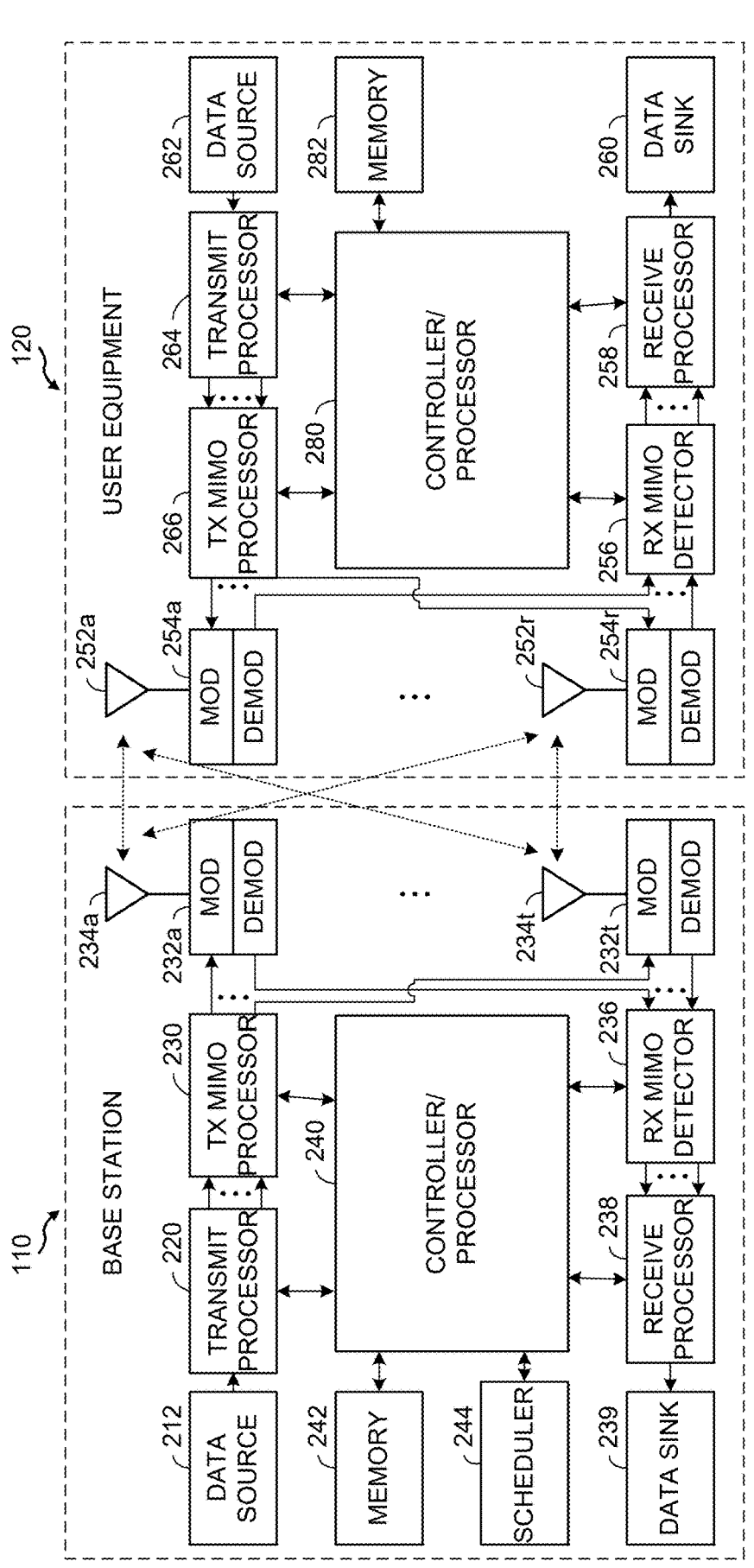
FIG. 2 depicts aspects of an example base station and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232*a-232t*. Each modulator in transceivers 232*a-232t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a-232t* may be transmitted via the antennas 234*a-234t*, respectively.

UE 120 includes antennas 252*a-252r* that may receive the downlink signals from the BS 110 and may provide received signals to the demodulators (DEMODs) in transceivers

254*a-254r*, respectively. Each demodulator in transceivers 254*a-254r* may condition (e.g., filter, amplify, downconvert, and digitize) a respective received signal to obtain input samples. Each demodulator may further process the input samples to obtain received symbols.

Receive (RX) MIMO detector 256 may obtain received symbols from all the demodulators in transceivers 254*a-254r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a-254r* (e.g., for SC-FDM), and transmitted to BS 110.

At BS 110, the uplink signals from UE 120 may be received by antennas 234*a-234t*, processed by the demodulators in transceivers 232*a-232t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a vRAN (also known as a cloud RAN (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
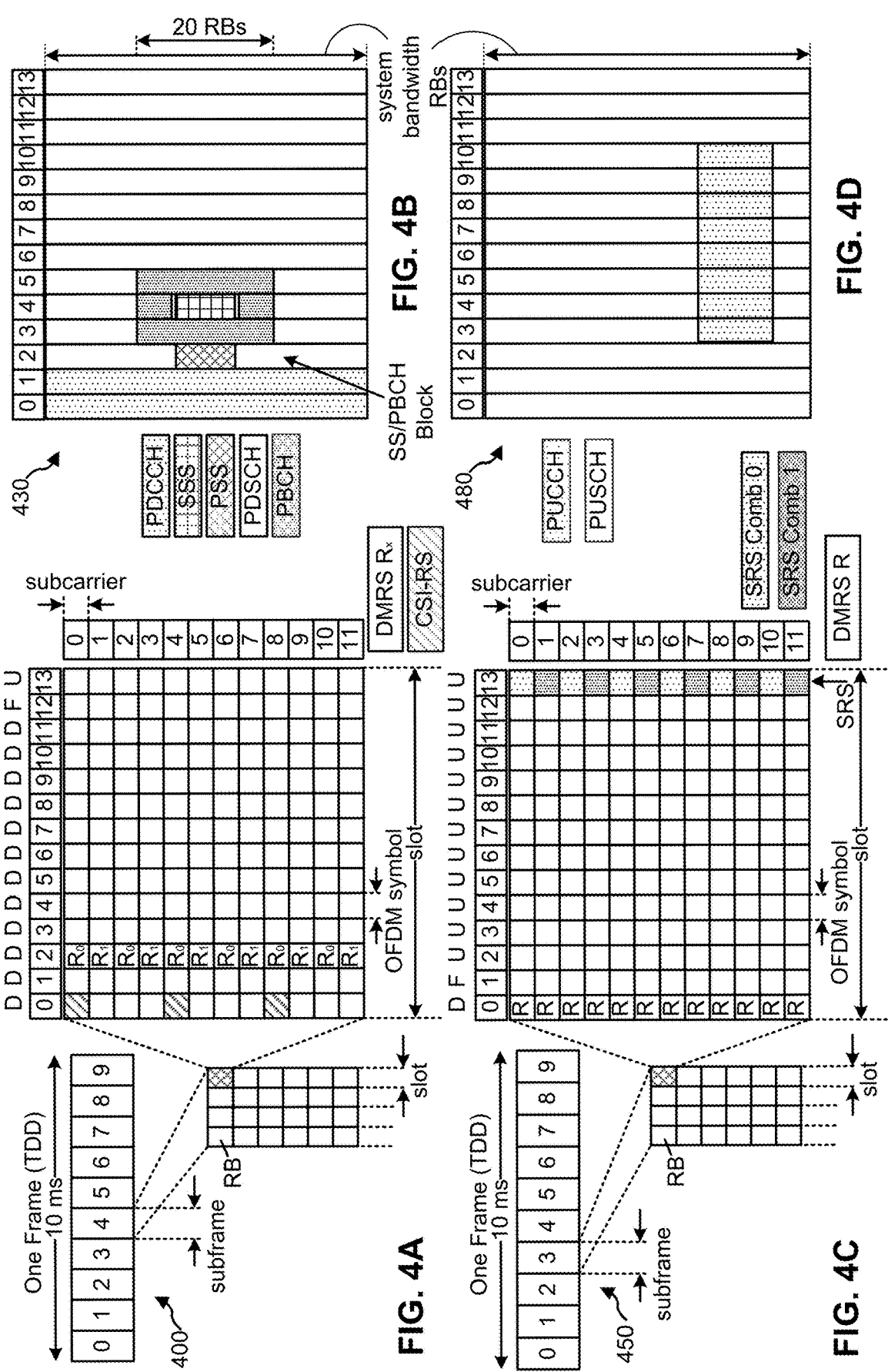
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu} \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
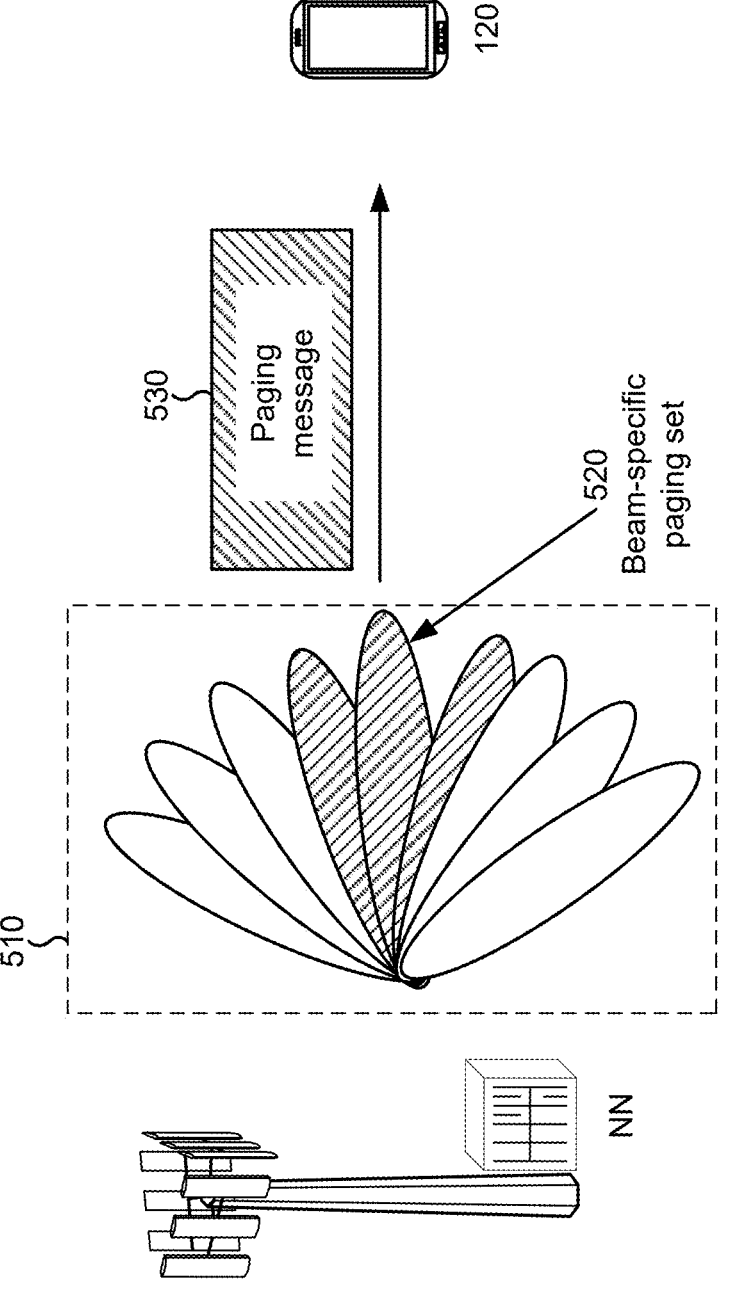
FIG. 5 is a diagram illustrating an example of beam-specific paging, in accordance with the present disclosure.

FIG. 5 is a diagram illustrating an example of beam-specific paging, in accordance with the present disclosure. Example 500 includes a network entity (e.g., a BS 110 or a component of a disaggregated BS described with regard to FIG. 3) and a UE (e.g., UE 120).

A full set of beams (for example, corresponding to a tracking area or a tracking area identifier list) is shown by reference number 510. A network entity that is not performing beam-specific paging may transmit a paging message on the full set of beams. In some aspects, the network entity that is not performing beam-specific paging may transmit a paging message on a full set of cells, such as a full set of cells associated with a tracking area or a tracking area identifier. As used herein, "transmitting a paging message" can include the network entity directly transmitting the paging message, or the network entity triggering another network entity or a cell to transmit the paging message.

A subset of beams, corresponding to beam-specific paging, is shown by reference number 520 and a hatched fill. As shown, when beam-specific paging is used, a paging message 530 is transmitted on the subset of beams (e.g., and not a remainder of beams of the full set of beams). When the paging message 530 is transmitted on the subset of beams, energy consumption is reduced relative to transmitting the paging message on the full set of beams. In some examples, the subset of beams may be based at least in part on a list of recommended beams (e.g., a recommended paging SSB list). For example, the subset of beams may include (or consist of) beams identified by the list of recommended beams. In some examples, the subset of beams may be based at least in part on a restricted beam. For example, the subset of beams may omit one or more beams (e.g., of the full set of beams) that are identified as restricted beams. As illustrated, the subset of beams may include fewer beams than the full set of beams.

The paging message 530 can be associated with (e.g., initiated by) RAN-initiated paging or core-network-initiated paging (e.g., for a UE in an RRC idle state). For RAN-initiated paging, a network entity (e.g., gNB) may identify UEs for which the beam-specific paging is applied. A CU (e.g., a gNB-CU) may provide a recommended paging SSB list (e.g., in an F1 Application Protocol (F1AP) PAGING message) to a gNB-DU. Additionally, or alternatively, the gNB-DU may transmit the recommended paging SSB list in a message (e.g., an F1AP UE CONTEXT RELEASE COMPLETE message) to the gNB-CU. For RRC IDLE state (e.g., core-network-initiated paging), the last (e.g., most recent or current) serving gNB of a UE may report a list of recommended beams (e.g., a last few served SSBs) of the gNB to an access and mobility management function (AMF) in a message (e.g., a UE CONTEXT RELEASE COMPLETE message) over a next generation application protocol (NGAP). The AMF may store the list of recommended beams while the UE is in an RRC idle state. During idle mode paging, the AMF may transmit information indicating the stored recommended beams back to a last serving gNB in the NGAP paging message. To assist in NGAP paging, it may be expected that the gNB provide (e.g., shall provide) the list of recommended beams to the core network only for UEs that are known to be stationary, but it may be up to the gNB's implementation to decide to which UEs the beam-specific paging is applied. The list of recommended beams may be transparent to the AMF.

If paging on the subset of beams shown by reference number 520 is unsuccessful, the network entity may transmit the paging message 530 on the full set of beams in a next paging cycle. For example, the list of recommended beams may be used to prioritize beam directions over which to sweep initially.

As indicated above, FIG. 5 is provided as an example. Other examples may differ from what is described with regard to FIG. 5.

Figure 6:
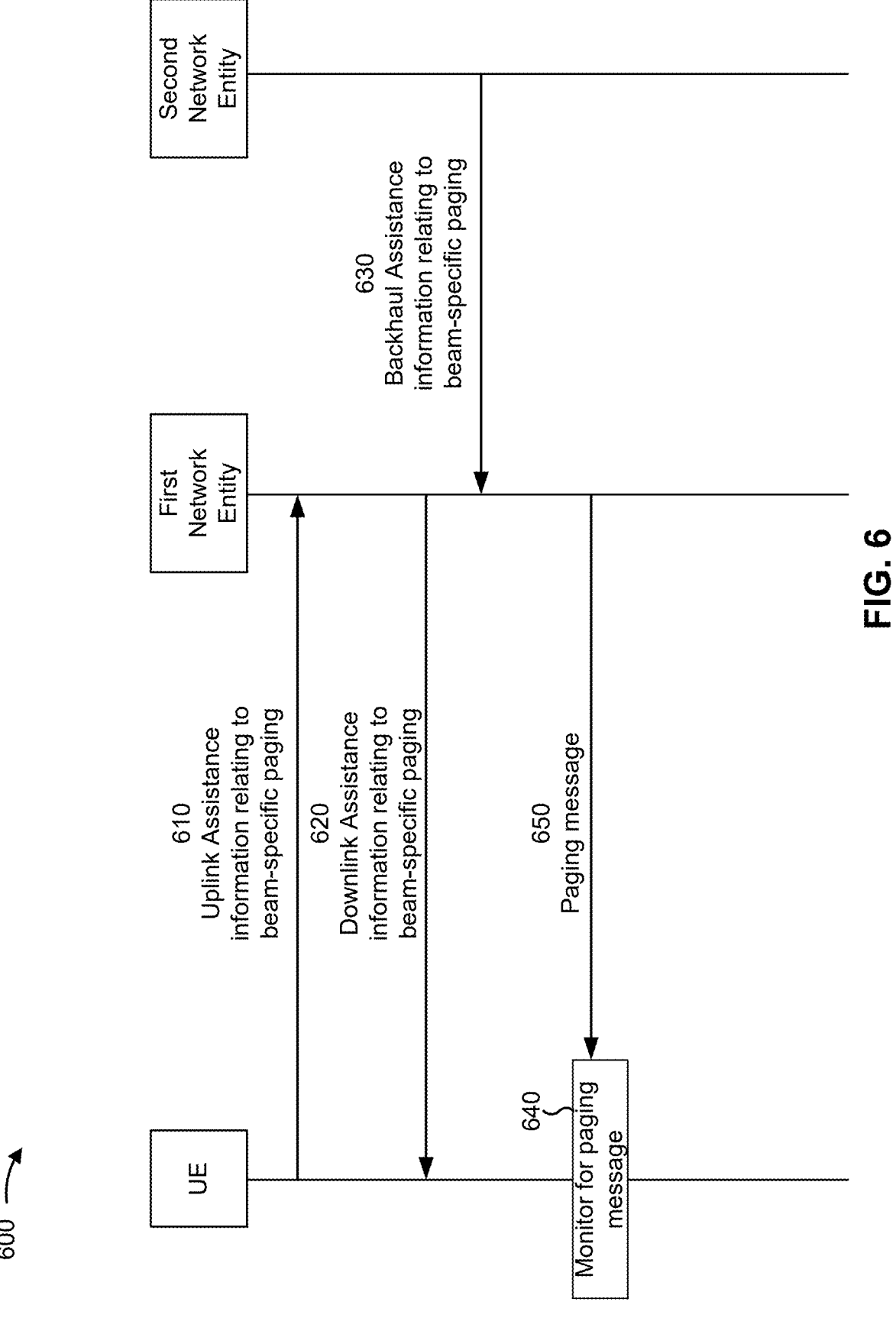
FIG. 6 is a diagram illustrating an example of signaling relating to beam-specific paging, in accordance with the present disclosure.

FIG. 6 is a diagram illustrating an example 600 of signaling relating to beam-specific paging, in accordance with the present disclosure. As shown, example 600 includes a UE (e.g., UE 120), a first network entity (e.g., BS 110 or a component of a disaggregated BS, described with regard to FIG. 3), and optionally a second network entity. The first network entity and the second network entity may be connected via a backhaul link (e.g., backhaul link 132, 134, 184), such as an F1 connection, an Xn connection, or an X2 connection. A backhaul link may be referred to as a backhaul connection. The operations shown by reference number 610, 620, and 630 can be performed in any order. Furthermore, in some examples, example 600 may include multiple transmissions of uplink assistance information, multiple transmissions of downlink assistance information, and/or multiple transmissions of backhaul assistance information.

Communications from the UE to the first network entity are referred to as uplink assistance information, and are shown by reference number 610. Unless noted otherwise, the UE may transmit the uplink assistance information, and the first network entity may receive the uplink assistance information, via any suitable form of signaling, such as uplink control information, RRC signaling, MAC signaling, random access channel signaling, small data transfer signaling, or another form of signaling.

In some aspects, the UE may transmit the uplink assistance information while the UE is connected to the network (e.g., to the first network entity). In some aspects, the uplink assistance information may include information indicating whether the UE supports beam-specific paging (e.g., a feature of beam-specific paging). In some aspects, the uplink assistance information may include information indicating whether the UE is stationary (e.g., associated with lower than a threshold level of movement). In some aspects, this information may be transmitted in a registration request or update for the UE.

In some aspects, the uplink assistance information may include information indicating a set of recommended beams, restricted beams, or a combination thereof, for the beam-specific paging. A recommended beam may include a beam (or information associated with the beam, such as an SSB index) for inclusion in a subset of beams for beam-specific paging. A restricted beam may include a beam (or information associated with the beam, such as an SSB index) for exclusion from a subset of beams for beam-specific paging. For example, the UE may identify a restricted beam as a beam that the UE is not in a coverage area of, or that the UE will move out of the coverage area of. For example, the UE may identify a recommended beam as a beam that the UE is in a coverage area of, or that the UE will move into a coverage area of. In some aspects, the set of recommended beams or restricted beams may relate to multiple cells. For example, the UE may transmit uplink assistance information relating to multiple cells if the UE is within a threshold distance (or signal strength) of a cell edge, or if the UE senses a neighbor cell according to a measurement that satisfies a threshold. In this example, the multiple cells may include a first cell of which the UE is in a coverage area, and a second cell that is the neighbor cell or a cell associated with the cell edge. Thus, the UE may provide updated or accurate information regarding candidate beams or a mobility state of the UE, which may assist the first network entity in implementing beam-specific paging. For example, the first network entity may transmit paging on a set of beams identified as recommended beams, or may omit a beam identified as a restricted beam from the set of beams.

In some aspects, the uplink assistance information may include an update to a set of recommended beams, a set of restricted beams, a set of recommended cells, or a set of restricted cells. Such an update may be an explicit update (e.g., identifying a beam to be added as a restricted beam) or an implicit update (e.g., transmitting information indicating a set of recommended beams, in which a beam is no longer identified as a recommended beam, may implicitly indicate that the beam is a restricted beam). In some aspects, the uplink assistance information (e.g., set list of recommended beams or cells, a set of restricted beams or cells, or an update thereof) may indicate a measurement result regarding a beam, such as a beam of the set of recommended beams or cells or a beam of the set of restricted beams or cells.

In some aspects, the uplink assistance information may indicate (e.g., may include a request) to disable (e.g., deactivate, pause, cease) beam-specific paging. For example, the UE may transmit this indication or request in connection with a mobility update or an information update (e.g., while the UE is in an RRC inactive mode or an RRC idle mode). For example, the uplink assistance information may include an indication that the UE will begin moving within a threshold length of time (e.g., X seconds), or that the UE has started moving. The indication that the UE will begin moving may comprise the indication to disable the beam-specific paging, or may be transmitted in addition to the indication to disable the beam-specific paging. The indication may be based at least in part on a semi-static behavior at the UE. For example, the UE may identify that the UE will begin moving within the threshold length of time according to the semi-static behavior (e.g., a schedule of the movement of the UE or the like).

In some aspects, such as when the UE is in an idle mode or an inactive mode, the UE may transmit the uplink assistance information (e.g., at least part of the uplink assistance information) via a registration update. For example, the UE may perform a new registration update with the first network entity, and may transmit the uplink assistance information as part of the new registration update. In some aspects, such as when the UE is in an idle mode or an inactive mode, the UE may transmit the uplink assistance information via a random access channel (RACH) transmission (such as a contention-free random access (CFRA) message) or a small data transfer (SDT) transmission. In the case of the RACH transmission (e.g., a RACH-based indication), the first network entity (e.g., a DU) may receive the uplink assistance information, and may update a database (at the DU) of recommended beams for the UE. In the case of the SDT transmission (e.g., an SDT-based indication), the first network entity (e.g., a CU) may receive the uplink assistance information. The CU may use a message (such as an F1AP PAGING message) to forward the uplink assistance information to the DU at a later stage. In some aspects, such as when the UE is in an idle mode or an inactive mode, the UE may transmit the uplink assistance information via a response to a paging early indication (PEI). A PEI is a message, transmitted prior to a paging occasion, that indicates whether a UE should decode paging in the paging occasion. The PEI may be transmitted using beamsweeping, for example, across a full set of beams. The UE may transmit a PEI response on a single beam (e.g., a single direction). The first network entity may transmit the corresponding paging message (in a paging occasion corresponding to the PEI) in a direction corresponding to the single beam.

Communications from the first network entity to the UE are referred to as downlink assistance information, and are shown by reference number 620. Unless noted otherwise, the first network entity may transmit the downlink assistance information, and the UE may receive the uplink assistance information, via any suitable form of signaling, such as downlink control information, RRC signaling, MAC signaling, random access channel signaling, or another form of signaling.

In some aspects, the downlink assistance information may include a request for the UE to provide a list of recommended or restricted beams. For example, the request may be a request for the UE to provide assistance information identifying a set of recommended beams or a set of restricted beams for the beam-specific paging. In this example, the UE may transmit the information identifying the set of recommended beams or the set of restricted beams via the uplink assistance information shown by reference number 610 (e.g., after receiving the downlink assistance information). In some aspects, the downlink assistance information may indicate a criterion (e.g., one or more criteria) for identifying recommended beams or restricted beams. In some aspects, the criterion may indicate a threshold, such as a measurement threshold for a beam. In some aspects, if a measurement on the beam (such as a Layer 1 measurement) satisfies the threshold, then the UE may identify the beam as a recommended beam, or if the measurement fails to satisfy the threshold, then the UE may identify the beam as a restricted beam. Thus, the first network entity may provide thresholds or criteria for the UE to come up with a beam recommendation/restriction. In some aspects, the first network entity may provide resources or a configuration (e.g., for RACH or SDT) that supports transmission of information indicating a set of recommended beams or a set of restricted beams.

In some aspects, the downlink assistance information may indicate a criterion for reselection (e.g., beam update and indication while the UE is in an idle or inactive mode). For example, the downlink assistance information may indicate a pool of beams or cells available for reselection (e.g., a pool of beams or cells to select from) and/or a pool of restricted beams or cells. If the UE identifies a beam or cell belonging to the pool of restricted beam or cells, the UE may notify (e.g., via uplink assistance information) the first network entity and/or may request that the first network entity disable beam-specific paging. In some aspects, the downlink assistance information may indicate a threshold for reselecting to a new beam, such as a measurement threshold. In some aspects, if a measurement on the beam (such as a Layer 1 measurement) satisfies the threshold, then the UE may identify the beam for reselection, or if the measurement fails to satisfy the threshold, then the UE may not identify the beam for reselection. In some aspects, the downlink assistance information may include timer information. For example, the timer information may indicate a timer length (e.g., an observation timer length). If the UE observes (e.g., measures) a new beam for the timer length (e.g., such that the new beam satisfies a threshold for measurement), then the UE may reselect to the new beam and may notify the first network entity (e.g., via uplink assistance information). For example, the first network entity may provide resources or a configuration (e.g., for RACH or SDT) that supports the notification of the new beam. As another example, the timer information may indicate an averaging time, which may indicate a length of time over which the UE should average (e.g., filter) measurements for a given beam.

As mentioned above, the first network entity may provide information indicating one or more criteria (such as one or more thresholds) for the UE to select recommended beams, restricted beams, or a combination thereof, or to identify a beam for reselection. For example, a threshold may be a measurement threshold, such as a reference signal received power (RSRP) threshold, a reference signal received quality (RSRQ) threshold, a signal-to-noise ratio (SNR) threshold, a signal-to-interference-plus-noise ratio (SINR) threshold, or a combination thereof. In some aspects, a criterion may include multiple thresholds. For example, a first threshold may be used to determine whether a beam should be identified as a recommended beam (e.g., if a measurement on a beam is higher than the first threshold, the UE may select the beam as a recommended beam), and a second threshold lower than the first threshold may be used to determine whether the beam should be identified as a restricted beam (e.g., if the measurement on the beam is lower than the second threshold, the UE may identify the beam as a restricted beam). In some aspects, a criterion may be common to all cells or beams of the UE. In some aspects, the criterion may be cell-specific. In some aspects, the criterion may be beam-specific. A cell-specific criterion or beam-specific criterion may be defined, for example, using an offset relative to a reference cell or beam. In some aspects, a threshold may be absolute (e.g., −90 dBm). In some other aspects, a threshold for a first beam or cell may be relative to a second beam or cell. For example, a threshold may be defined as a difference between RSRP or RSRQ across two beams. The downlink assistance information, such as the information indicating the one or more criteria, may be provided in a broadcast message, a group-common message, or a dedicated message. In some aspects, a criterion may be different for recommended beam selection in a connected mode than for reselection in an idle or inactive mode.

In some aspects, the downlink assistance information may indicate whether a cell (e.g., a cell implemented by the first network entity) supports beam-specific paging (e.g., implements the feature of beam-specific paging). For example, the downlink assistance information may provide this information via broadcast signaling (e.g., system information), dedicated signaling (e.g., RRC signaling or another form of dedicated signaling), or a combination thereof. In the combination of broadcast signaling and dedicated signaling, a network entity may indicate that the network entity (e.g., cell implemented by the network entity) supports the beam-specific paging via broadcast signaling, and may transmit a dedicated message indicating to a UE whether the beam-specific paging is enabled for the UE. In some aspects, the dedicated message may indicate a subset of beams or cells or beams of a cell (e.g., shown by reference number 520 of FIG. 5) for the beam-specific paging, such as a pool of beams or cells on which the beam-specific paging will be transmitted or a pool of restricted beams. In some aspects, the combination of broadcast signaling and dedicated signaling may indicate whether a neighbor cell of the UE supports beam-specific paging and/or a subset of beams or restricted beams associated with the neighbor cell for the beam-specific paging. The subset of beams or the set of restricted beams may be indicated via a list of SSB beams or cells (e.g., via dedicated RRC signaling). In some aspects, the downlink assistance information may indicate the subset of beams for beam-specific paging or the set of restricted beams for multiple cells. For example, the downlink assistance information be based at least in part on an ordered list of beams (which may indicate a subset of beams for the beam-specific paging, a pool of beams or cells available for selection as recommended beams, a pool of beams or cells that are restricted beams or cells, or a combination thereof).

In some aspects, the downlink assistance information may indicate a set of beams that carry a same paging message. For example, the downlink assistance information may indicate a group of SSBs that carry the same paging message. Thus, the downlink assistance information may facilitate the UE combining reception of the same paging message across the set of beams. Additionally, or alternatively, the downlink assistance information may indicate a set of beams that carry a specific paging message that is different from a default paging message. For example, the downlink assistance information may indicate a list of SSBs whose paging messages may be different from a remainder of SSBs (e.g., associated with a default paging message).

In some aspects, the downlink assistance information (e.g., a PEI and/or a paging PDCCH) may indicate whether the UE can combine paging messages during a paging cycle. For example, the downlink assistance information may indicate whether the UE can combine paging PDSCHs in a current paging cycle. Such an indication may be specific to the beam over which the PEI or paging PDCCH is sent, or specific a group of beams to which the PEI or PDCCH beam belongs, or applicable to all beams or all groups of beams. In some aspects, the downlink assistance information may indicate a list of other beams that carry the same paging PDSCH as a beam on which the downlink assistance information is received. For example, this indication may be via indexing to a list of SSBs (e.g., may indicate an index of an SSB of the list of SSBs), such as a preconfigured list of SSBs (e.g., preconfigured via RRC signaling, system information, or the like). In some aspects, the downlink assistance information may indicate a list of beams that carry a paging PDSCH. For example, this indication may be via indexing to a list of SSBs (e.g., may indicate an index of an SSB of the list of SSBs), such as a preconfigured list of SSBs (e.g., preconfigured via RRC signaling, system information, or the like).

Communications between the first network entity and the second network entity are referred to as backhaul assistance information, and are shown by reference number 630. Unless noted otherwise, one network entity (e.g., the second network entity) may transmit the backhaul assistance information, and the other network entity (e.g., the first network entity) may receive the backhaul assistance information, via any suitable form of signaling, such as F1AP signaling, X2/Xn signaling, or another form of signaling.

In the description of the backhaul assistance information, certain aspects are described which have already been described in more detail above, such as recommended beams or cells, restricted beams or cells, information indicating whether a UE is stationary, and so on. For a more detailed description of these aspects, refer to the description associated with reference numbers 610 and 620, above.

In some aspects, the backhaul assistance information may include information indicating a set of recommended beams and/or a set of restricted beams for multiple cells. For example, in the case of RAN paging (e.g., in association with the Xn application protocol (XnAP)), the backhaul assistance information may be provided via Xn signaling. As another example, in the case of core network paging (e.g., in association with the NGAP), a last serving network entity of the UE may provide backhaul assistance information (e.g., indicating recommended beams of cells associated with other gNBs) to an AMF. The AMF may provide information indicating recommended beams of one or more cells or restricted beams of the one or more cells to one or more gNBs that are not the last serving gNB of the UE. The information indicating the set of recommended beams and/or the set of restricted beams may be provided as an ordered list, in some aspects.

In some aspects, the backhaul assistance information may indicate whether a UE is stationary, or whether the UE is expected to move within a threshold length of time. For example, the second network entity may transmit, to the first network entity, information indicating whether the UE is stationary (e.g., the second network entity may have stored information regarding one or more last serving SSB directions for the UE). As another example, an AMF may provide backhaul assistance information to the first network entity indicating whether the UE is stationary or not. For example, the first network entity (or the AMF) may have stored information regarding the last serving SSB directions for the UE.

As shown by reference number 640, the UE may monitor for a paging message. For example, the UE may monitor for the paging message in accordance with the uplink assistance information (e.g., by monitoring beams of a set of recommended beams, by reporting if the UE detects a beam belonging to a set of restricted beams, by reporting a recommended beam or restricted beam according to a criterion, or the like). As another example, the UE may monitor for the paging message in accordance with the downlink assistance information (e.g., by monitoring beams of a set of recommended beams, by reporting if the UE detects a beam belonging to a set of restricted beams, by reporting a recommended beam or restricted beam according to a criterion, by reselecting to a new beam according to a criterion, or the like). As shown by reference number 650, the first network entity may transmit the paging message. For example, the first network entity may transmit the paging message on a subset of beams (e.g., beams indicated by a set of recommended beams) if beam-specific paging is enabled. As another example, the first network entity may transmit one or more paging messages on a full set of beams (e.g., shown by reference number 520) if beam-specific paging is disabled.

In some aspects, the first network entity may activate or deactivate beam-specific paging based at least in part on a recipient of the beam-specific paging. For example, if a recipient UE is stationary, the first network entity may enable beam-specific paging for the recipient UE (e.g., transparently to the recipient UE). As another example, if a recipient UE supports beam-specific paging, the first network entity may enable beam-specific paging for the recipient UE. As another example, the first network entity may disable beam-specific paging (e.g., may transmit a paging message on a full set of beams or in all directions) for a recipient UE based at least in part on the recipient UE being mobile or not supporting beam-specific paging. In this example, the first network entity may (e.g., transparently) activate beam-specific paging for one or more other UEs, such as stationary UEs or UEs that support beam-specific paging. In this example, the first network entity may transmit a first paging message for the recipient UE, and one or more different paging messages for the one or more other UEs.

In some aspects, in a paging cycle, if a mobile UE or a UE that does not support beam-specific paging is to be paged in all beam directions (e.g., without beam-specific paging on a full set of beams), the first network entity may transmit the same paging message in all beam directions (e.g., on the full set of beams, without beam-specific paging). Thus, beam-specific paging, even for stationary UEs, may be disabled in the paging cycle. In the paging cycle, if only stationary UEs or UEs supporting beam-specific paging are to be paged, the first network entity may adopt beam-specific paging to avoid sending paging messages in all directions and/or may send different paging messages in different directions.

In some aspects, the UE may detect multiple SSBs that satisfy a measurement threshold. In some aspects, the UE may monitor paging associated with only one of the multiple SSBs. For example, the UE may monitor paging only on a strongest beam corresponding to a strongest SSB of the multiple SSBs. As another example, the UE may monitor paging on a beam corresponding to the first SSB within a set (e.g., an SSB with the lowest index within a set of SSBs that are sufficiently strong). Alternatively, the UE may monitor paging on two or more SSBs. For example, the UE may perform sequential monitoring of the two or more SSBs (e.g., following an order, such as stronger SSBs to weaker SSBs, or first SSB index to last SSB index). As another example, the UE may combine paging across multiple beams corresponding to the two or more SSBs.

As indicated above, FIG. 6 is provided as an example. Other examples may differ from what is described with regard to FIG. 6.

Figure 7:
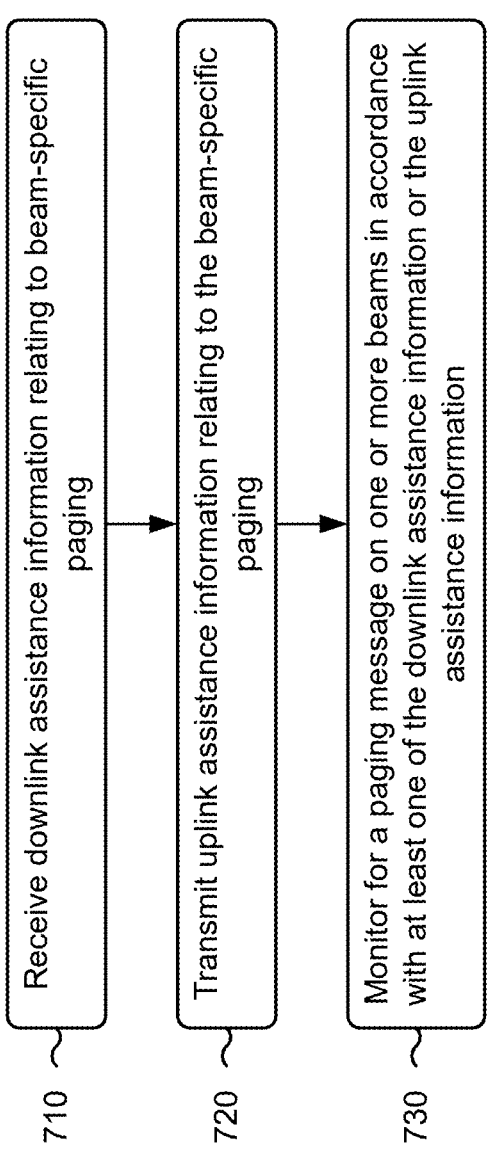
FIG. 7 is a flowchart of an example method of wireless communication.

FIG. 7 is a flowchart of an example method 700 of wireless communication. The method 700 may be performed by, for example, a UE (e.g., UE 120).

Method 700 begins at 710 with receiving downlink assistance information relating to beam-specific paging. For example, the UE may receive downlink assistance information relating to beam-specific paging, as described above in connection with, for example, FIG. 6 and at reference number 620.

Method 700 then proceeds at 720 with transmitting uplink assistance information relating to the beam-specific paging. For example, the UE may transmit uplink assistance information relating to the beam-specific paging, as described above in connection with, for example, FIG. 6 and at reference number 610.

Method 700 then proceeds at 730 with monitoring for a paging message on one or more beams in accordance with at least one of the downlink assistance information or the uplink assistance information. For example, the UE may monitor for a paging message on one or more beams in accordance with at least one of the downlink assistance information or the uplink assistance information, as described above in connection with, for example, FIG. 6 and at reference number 640.

In some aspects, monitoring for the paging message on one or more beams in accordance with at least one of the downlink assistance information or the uplink assistance information further comprises monitoring for the paging message in accordance with the downlink assistance information.

In some aspects, monitoring for the paging message on one or more beams in accordance with at least one of the downlink assistance information or the uplink assistance information further comprises monitoring for the paging message in accordance with the uplink assistance information.

In some aspects, the uplink assistance information includes information identifying a set of recommended beams or a set of restricted beams for the beam-specific paging.

In some aspects, the information identifying the set of recommended beams or the set of restricted beams relates to multiple cells.

In some aspects, the information identifying the set of recommended beams or the set of restricted beams indicates a measurement result regarding a beam of the set of recommended beams or the set of restricted beams.

In some aspects, the information identifying the set of recommended beams or the set of restricted beams indicates an update to the set of recommended beams or the set of restricted beams.

In some aspects, the uplink assistance information includes an indication that the UE will begin moving within a threshold length of time, and the uplink assistance information includes an indication to disable the beam-specific paging.

In some aspects, transmitting the uplink assistance information further comprises transmitting the uplink assistance information via a random access channel transmission or an SDT transmission.

In some aspects, the downlink assistance information includes a request for the UE to provide information identifying a set of recommended beams or a set of restricted beams for the beam-specific paging, and transmitting the uplink assistance information further comprises transmitting information identifying the set of recommended beams or the set of restricted beams for the beam-specific paging.

In some aspects, the downlink assistance information indicates a criterion for identifying recommended beams or restricted beams for the beam-specific paging, and the method further comprises identifying a set of recommended beams or a set of restricted beams in accordance with the downlink assistance information.

In some aspects, the downlink assistance information indicates a criterion relating to at least one of a pool of beams or cells available for reselection, a pool of restricted beams or cells, a threshold for reselecting to a new beam, or information relating to reselection, wherein the method further comprises transmitting information indicating a beam reselection based at least in part on the downlink assistance information.

In some aspects, the downlink assistance information indicates whether a cell supports the beam-specific paging.

In some aspects, the downlink assistance information indicates whether the cell supports the beam-specific paging via a combination of broadcast signaling and dedicated signaling.

In some aspects, the cell is a neighbor cell.

In some aspects, the downlink assistance information indicates at least one of a pool of beams or cells available as recommended beams or cells, a pool of beams or cells that are restricted beams or cells, or an ordered list of beams or cells available as recommended beams.

In some aspects, the downlink assistance information indicates at least one of a set of beams that carry a same paging message, or a set of beams that carry a specific paging message that is different from a default paging message.

In some aspects, the downlink assistance information indicates at least one of whether the UE can combine the paging message during a paging cycle, one or more beams carrying a same paging message as a beam on which the downlink assistance information is received, or a set of beams that carry the paging message.

In one aspect, method 700, or any aspect related to it, may be performed by an apparatus, such as communications device 900 of FIG. 9, which includes various components operable, configured, or adapted to perform the method 700. Communications device 900 is described below in further detail.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
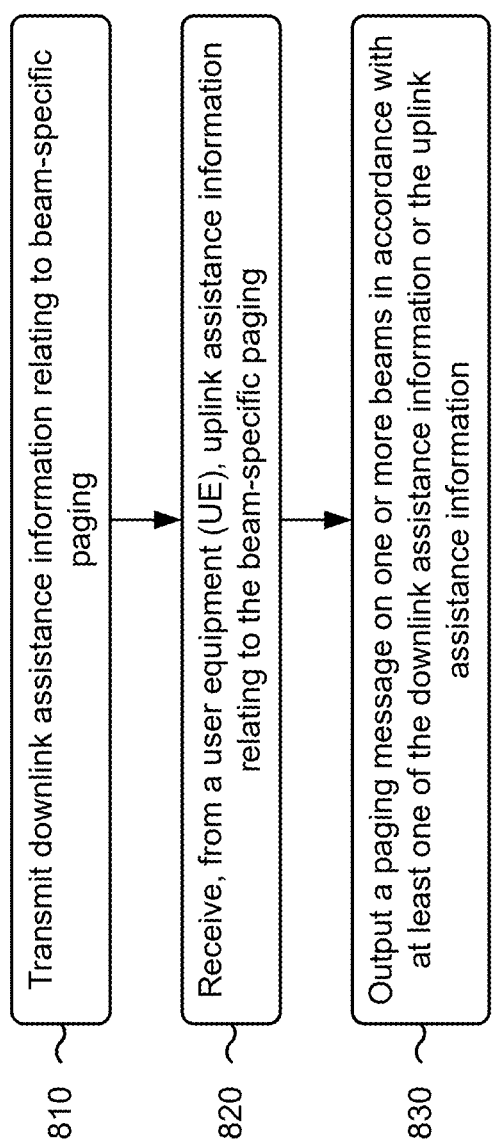
FIG. 8 is a flowchart of an example method of wireless communication.

FIG. 8 is a flowchart of an example method 800 of wireless communication. The method 800 may be performed by, for example, a network entity (e.g., BS 110, a component of a disaggregated base station described in FIG. 3, the network entity of FIG. 5, the first network entity of FIG. 6).

Method 800 begins at 810 with transmitting downlink assistance information relating to beam-specific paging. For example, the network entity may transmit downlink assistance information relating to beam-specific paging, as described above in connection with, for example, FIG. 6 and at reference number 620.

Method 800 then proceeds at 820 with receiving, from a UE, uplink assistance information relating to the beam-specific paging. For example, the network entity may receive, from a UE, uplink assistance information relating to the beam-specific paging, as described above in connection with, for example, FIG. 6 and at 610.

Method 800 then proceeds at 830 with outputting a paging message on one or more beams in accordance with at least one of the downlink assistance information or the uplink assistance information. For example, the network entity may output a paging message on one or more beams in accordance with at least one of the downlink assistance information or the uplink assistance information, as described above in connection with, for example, FIG. 6 and at 650.

In some aspects, the uplink assistance information includes information identifying a set of recommended beams or a set of restricted beams for the beam-specific paging.

In some aspects, the information identifying the set of recommended beams or the set of restricted beams relates to multiple cells.

In some aspects, the information identifying the set of recommended beams or the set of restricted beams indicates a measurement result regarding a beam of the set of recommended beams or the set of restricted beams.

In some aspects, the information identifying the set of recommended beams or the set of restricted beams indicates an update to the set of recommended beams or the set of restricted beams.

In some aspects, method 800 includes receiving backhaul assistance information via a backhaul link with a second network entity.

In some aspects, the backhaul assistance information relates to multiple cells and includes information identifying a set of recommended beams or a set of restricted beams for the beam-specific paging.

In some aspects, the information identifying the set of recommended beams or the set of restricted beams includes an ordered list of beams.

In some aspects, the backhaul assistance information indicates whether the UE is stationary.

In some aspects, the uplink assistance information includes an indication that the UE will begin moving at a future time, and the uplink assistance information includes an indication to disable the beam-specific paging.

In some aspects, receiving the uplink assistance information further comprises receiving the uplink assistance information via a random access channel transmission or a small data transfer (SDT) transmission.

In some aspects, the network entity is a central unit and the method further comprises forwarding the uplink assistance information to a distributed unit.

In some aspects, the downlink assistance information includes a request for the UE to provide information identifying a set of recommended beams or a set of restricted beams for the beam-specific paging, and receiving the uplink assistance information further comprises receiving information identifying the set of recommended beams or the set of restricted beams for the beam-specific paging.

In some aspects, the downlink assistance information indicates a criterion for identifying recommended beams or restricted beams for the beam-specific paging.

In some aspects, the downlink assistance information indicates a criterion relating to at least one of a pool of beams or cells available for reselection, a pool of restricted beams or cells, a threshold for reselecting to a new beam, or information relating to reselection, wherein the method further comprises receiving information indicating a beam reselection based at least in part on the downlink assistance information.

In some aspects, the downlink assistance information indicates whether a cell associated with the network entity supports the beam-specific paging.

In some aspects, the downlink assistance information indicates whether the cell supports the beam-specific paging via a combination of broadcast signaling and dedicated signaling.

In some aspects, the downlink assistance information indicates whether a neighbor cell supports the beam-specific paging.

In some aspects, the downlink assistance information indicates at least one of a pool of beams or cells available as recommended beams or cells, a pool of beams or cells that are restricted beams or cells, or an ordered list of beams or cells available as recommended beams.

In some aspects, the downlink assistance information indicates at least one of a set of beams that carry a same paging message, or a set of beams that carry a specific paging message that is different from a default paging message.

In some aspects, the downlink assistance information indicates at least one of whether the UE can combine the paging message during a paging cycle, one or more beams carrying a same paging message as a beam on which the downlink assistance information is received, or a set of beams that carry the paging message.

In some aspects, outputting the paging message further comprises transmitting the paging message on a set of beams associated with the beam-specific paging.

In some aspects, the set of beams includes a set of recommended beams.

In some aspects, outputting the paging message further comprises outputting the paging message with beam-specific paging disabled based at least in part on a recipient UE being paged in all beam directions.

In some aspects, outputting the paging message further comprises outputting the paging message on a set of beams associated with the beam-specific paging based at least in part on a recipient UE being stationary or supporting the beam-specific paging.

Figure 10:
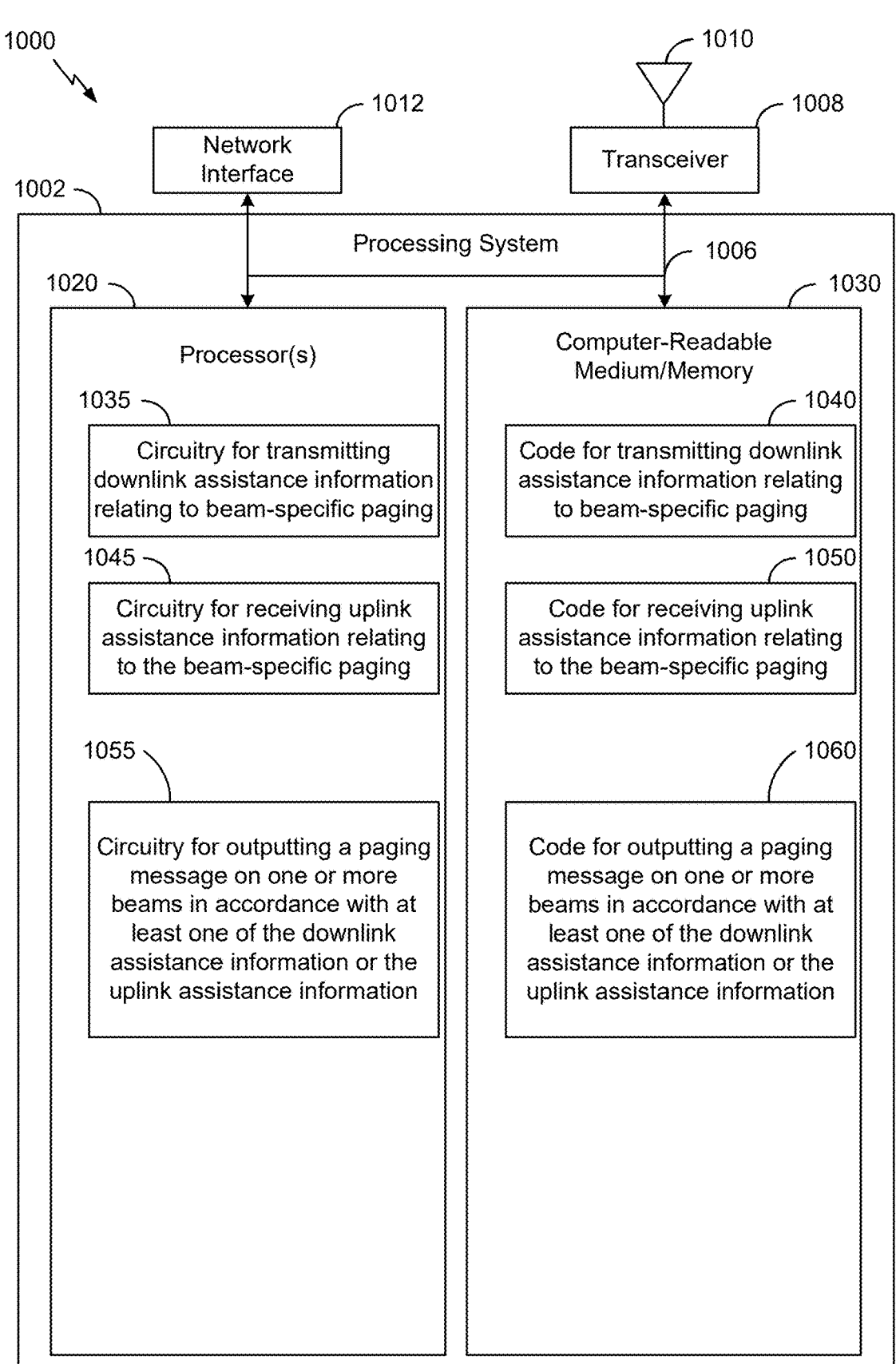
FIG. 10 is a diagram illustrating an example of an implementation of code and circuitry for a communications device, in accordance with the present disclosure.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

FIG. 9 is a diagram illustrating an example of an implementation of code and circuitry for a communications device 900, in accordance with the present disclosure. The communications device 900 may be a UE, or a UE may include the communications device 900.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 258, transmit processor 264, TX MIMO processor 266, and/or controller/processor 280, as described with respect to FIG. 2. The one or more processors 920 are coupled to a computer-readable medium/memory 930 via a bus 906. In various aspects, the computer-readable medium/memory 930 may be representative of memory 282, as described with respect to FIG. 2. In certain aspects, the computer-readable medium/memory 930 is configured to store instructions (e.g., computer-executable code, processor-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

As shown in FIG. 9, the communications device 900 may include circuitry for receiving downlink assistance information relating to beam-specific paging (circuitry 935).

As shown in FIG. 9, the communications device 900 may include, stored in computer-readable medium/memory 930, code for receiving downlink assistance information relating to beam-specific paging (code 940).

As shown in FIG. 9, the communications device 900 may include circuitry for transmitting uplink assistance information relating to the beam-specific paging (circuitry 945).

As shown in FIG. 9, the communications device 900 may include, stored in computer-readable medium/memory 930, code for transmitting uplink assistance information relating to the beam-specific paging (code 950).

As shown in FIG. 9, the communications device 900 may include circuitry for monitoring for a paging message on one or more beams in accordance with at least one of the downlink assistance information or the uplink assistance information (circuitry 955).

As shown in FIG. 9, the communications device 900 may include, stored in computer-readable medium/memory 930, code for monitoring for a paging message on one or more beams in accordance with at least one of the downlink assistance information or the uplink assistance information (code 960).

Various components of the communications device 900 may provide means for performing the method 700 described with respect to FIG. 7, or any aspect related to it. For example, means for transmitting, sending, or outputting for transmission may include the transceiver(s) 254 and/or antenna(s) 252 of the UE 120 and/or transceiver 908 and antenna 910 of the communications device 900 in FIG. 9. Means for receiving or obtaining may include the transceiver(s) 254 and/or antenna(s) 252 of the UE 120 and/or transceiver 908 and antenna 910 of the communications device 900 in FIG. 9.

FIG. 9 is provided as an example. Other examples may differ from what is described in connection with FIG. 9.

FIG. 10 is a diagram illustrating an example of an implementation of code and circuitry for a communications device 1000, in accordance with the present disclosure. The communications device 1000 may be a network entity (such as BS 110 or a disaggregated base station as described with regard to FIG. 3), or a network entity may include the communications device 1000.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 3. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 238, transmit processor 220, TX MIMO processor 230, and/or controller/processor 240, as described with respect to FIG. 2. The one or more processors 1020 are coupled to a computer-readable medium/memory 1030 via a bus 1006. In various aspects, the computer-readable medium/memory 1030 may be representative of memory 242, as described with respect to FIG. 2. In certain aspects, the computer-readable medium/memory 1030 is configured to store instructions (e.g., computer-executable code, processor-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

As shown in FIG. 10, the communications device 1000 may include circuitry for transmitting downlink assistance information relating to beam-specific paging (circuitry 1035).

As shown in FIG. 10, the communications device 1000 may include, stored in computer-readable medium/memory 1030, code for transmitting downlink assistance information relating to beam-specific paging (code 1040).

As shown in FIG. 10, the communications device 1000 may include circuitry for receiving uplink assistance information relating to the beam-specific paging (circuitry 1045).

As shown in FIG. 10, the communications device 1000 may include, stored in computer-readable medium/memory 1030, code for receiving uplink assistance information relating to the beam-specific paging (code 1050).

As shown in FIG. 10, the communications device 1000 may include circuitry for outputting a paging message on one or more beams in accordance with at least one of the downlink assistance information or the uplink assistance information (circuitry 1055).

As shown in FIG. 10, the communications device 1000 may include, stored in computer-readable medium/memory 1030, code for outputting a paging message on one or more beams in accordance with at least one of the downlink assistance information or the uplink assistance information (code 1060).

Various components of the communications device 1000 may provide means for performing the method 800 described with respect to FIG. 8, or any aspect related to it. For example, means for transmitting, sending, or outputting for transmission may include the transceiver(s) 232 and/or antenna(s) 234 of the BS 110 and/or transceiver 1008 and antenna 1010 of the communications device 1000 in FIG. 10. Means for receiving or obtaining may include the transceiver(s) 232 and/or antenna(s) 234 of the BS 110 and/or transceiver 1008 and antenna 1010 of the communications device 1000 in FIG. 10.

FIG. 10 is provided as an example. Other examples may differ from what is described in connection with FIG. 10.

The following provides an overview of some Aspects of the present disclosure:

Aspect 1: A method of wireless communication performed by a user equipment (UE), comprising: receiving downlink assistance information relating to beam-specific paging; transmitting uplink assistance information relating to the beam-specific paging; and monitoring for a paging message on one or more beams in accordance with at least one of the downlink assistance information or the uplink assistance information.

Aspect 2: The method of Aspect 1, wherein monitoring for the paging message on one or more beams in accordance with at least one of the downlink assistance information or the uplink assistance information further comprises monitoring for the paging message in accordance with the downlink assistance information.

Aspect 3: The method of any of Aspects 1-2, wherein monitoring for the paging message on one or more beams in accordance with at least one of the downlink assistance information or the uplink assistance information further comprises monitoring for the paging message in accordance with the uplink assistance information.

Aspect 4: The method of any of Aspects 1-3, wherein the uplink assistance information includes information identifying a set of recommended beams or a set of restricted beams for the beam-specific paging.

Aspect 5: The method of Aspect 4, wherein the information identifying the set of recommended beams or the set of restricted beams relates to multiple cells.

Aspect 6: The method of Aspect 4, wherein the information identifying the set of recommended beams or the set of restricted beams indicates a measurement result regarding a beam of the set of recommended beams or the set of restricted beams.

Aspect 7: The method of Aspect 6, wherein the information identifying the set of recommended beams or the set of restricted beams indicates an update to the set of recommended beams or the set of restricted beams.

Aspect 8: The method of any of Aspects 1-7, wherein the uplink assistance information includes an indication that the UE will begin moving within a threshold length of time, and wherein the uplink assistance information includes an indication to disable the beam-specific paging.

Aspect 9: The method of any of Aspects 1-8, wherein transmitting the uplink assistance information further comprises transmitting the uplink assistance information via a random access channel transmission or a small data transfer (SDT) transmission.

Aspect 10: The method of any of Aspects 1-9, wherein the downlink assistance information includes a request for the UE to provide information identifying a set of recommended beams or a set of restricted beams for the beam-specific paging, and wherein transmitting the uplink assistance information further comprises transmitting information identifying the set of recommended beams or the set of restricted beams for the beam-specific paging.

Aspect 11: The method of any of Aspects 1-10, wherein the downlink assistance information indicates a criterion for identifying recommended beams or restricted beams for the beam-specific paging, and wherein the method further comprises identifying a set of recommended beams or a set of restricted beams in accordance with the downlink assistance information.

Aspect 12: The method of any of Aspects 1-11, wherein the downlink assistance information indicates a criterion relating to at least one of: a pool of beams or cells available for reselection, a pool of restricted beams or cells, a threshold for reselecting to a new beam, or timer information relating to reselection, wherein the method further comprises transmitting information indicating a beam reselection based at least in part on the downlink assistance information.

Aspect 13: The method of any of Aspects 1-12, wherein the downlink assistance information indicates whether a cell supports the beam-specific paging.

Aspect 14: The method of Aspect 13, wherein the downlink assistance information indicates whether the cell supports the beam-specific paging via a combination of broadcast signaling and dedicated signaling.

Aspect 15: The method of Aspect 13, wherein the cell is a neighbor cell.

Aspect 16: The method of any of Aspects 1-15, wherein the downlink assistance information indicates at least one of: a pool of beams or cells available as recommended beams or cells, a pool of beams or cells that are restricted beams or cells, or an ordered list of beams or cells available as recommended beams.

Aspect 17: The method of any of Aspects 1-16, wherein the downlink assistance information indicates at least one of: a set of beams that carry a same paging message, or a set of beams that carry a specific paging message that is different from a default paging message.

Aspect 18: The method of any of Aspects 1-17, wherein the downlink assistance information indicates at least one of: whether the UE can combine the paging message during a paging cycle, one or more beams carrying a same paging message as a beam on which the downlink assistance information is received, or a set of beams that carry the paging message.

Aspect 19: A method of wireless communication performed by a network entity, comprising: transmitting downlink assistance information relating to beam-specific paging; receiving, from a user equipment (UE), uplink assistance information relating to the beam-specific paging; and outputting a paging message on one or more beams in accordance with at least one of the downlink assistance information or the uplink assistance information.

Aspect 20: The method of Aspect 19, wherein the uplink assistance information includes information identifying a set of recommended beams or a set of restricted beams for the beam-specific paging.

Aspect 21: The method of Aspect 20, wherein the information identifying the set of recommended beams or the set of restricted beams relates to multiple cells.

Aspect 22: The method of Aspect 20, wherein the information identifying the set of recommended beams or the set of restricted beams indicates a measurement result regarding a beam of the set of recommended beams or the set of restricted beams.

Aspect 23: The method of Aspect 22, wherein the information identifying the set of recommended beams or the set of restricted beams indicates an update to the set of recommended beams or the set of restricted beams.

Aspect 24: The method of any of Aspects 19-23, further comprising receiving backhaul assistance information via a backhaul link with a second network entity.

Aspect 25: The method of Aspect 24, wherein the backhaul assistance information relates to multiple cells and includes information identifying a set of recommended beams or a set of restricted beams for the beam-specific paging.

Aspect 26: The method of Aspect 25, wherein the information identifying the set of recommended beams or the set of restricted beams includes an ordered list of beams.

Aspect 27: The method of Aspect 24, wherein the backhaul assistance information indicates whether the UE is stationary.

Aspect 28: The method of any of Aspects 19-27, wherein the uplink assistance information includes an indication that the UE will begin moving at a future time, and wherein the uplink assistance information includes an indication to disable the beam-specific paging.

Aspect 29: The method of any of Aspects 19-28, wherein receiving the uplink assistance information further comprises receiving the uplink assistance information via a random access channel transmission or a small data transfer (SDT) transmission.

Aspect 30: The method of Aspect 29, wherein the network entity is a central unit and the method further comprises forwarding the uplink assistance information to a distributed unit.

Aspect 31: The method of any of Aspects 19-30, wherein the downlink assistance information includes a request for the UE to provide information identifying a set of recommended beams or a set of restricted beams for the beam-specific paging, and wherein receiving the uplink assistance information further comprises receiving information identifying the set of recommended beams or the set of restricted beams for the beam-specific paging.

Aspect 32: The method of any of Aspects 19-31, wherein the downlink assistance information indicates a criterion for identifying recommended beams or restricted beams for the beam-specific paging.

Aspect 33: The method of any of Aspects 19-32, wherein the downlink assistance information indicates a criterion relating to at least one of: a pool of beams or cells available for reselection, a pool of restricted beams or cells, a threshold for reselecting to a new beam, or timer information relating to reselection, wherein the method further comprises receiving information indicating a beam reselection based at least in part on the downlink assistance information.

Aspect 34: The method of any of Aspects 19-33, wherein the downlink assistance information indicates whether a cell associated with the network entity supports the beam-specific paging.

Aspect 35: The method of Aspect 34, wherein the downlink assistance information indicates whether the cell supports the beam-specific paging via a combination of broadcast signaling and dedicated signaling.

Aspect 36: The method of any of Aspects 19-35, wherein the downlink assistance information indicates whether a neighbor cell supports the beam-specific paging.

Aspect 37: The method of any of Aspects 19-36, wherein the downlink assistance information indicates at least one of: a pool of beams or cells available as recommended beams or cells, a pool of beams or cells that are restricted beams or cells, or an ordered list of beams or cells available as recommended beams.

Aspect 38: The method of any of Aspects 19-37, wherein the downlink assistance information indicates at least one of: a set of beams that carry a same paging message, or a set of beams that carry a specific paging message that is different from a default paging message.

Aspect 39: The method of any of Aspects 19-38, wherein the downlink assistance information indicates at least one of: whether the UE can combine the paging message during a paging cycle, one or more beams carrying a same paging message as a beam on which the downlink assistance information is received, or a set of beams that carry the paging message.

Aspect 40: The method of any of Aspects 19-39, wherein outputting the paging message further comprises transmitting the paging message on a set of beams associated with the beam-specific paging.

Aspect 41: The method of Aspect 40, wherein the set of beams includes a set of recommended beams.

Aspect 42: The method of any of Aspects 19-41, wherein outputting the paging message further comprises outputting the paging message with beam-specific paging disabled based at least in part on a recipient UE being paged in all beam directions.

Aspect 43: The method of any of Aspects 19-42, wherein outputting the paging message further comprises outputting the paging message on a set of beams associated with the beam-specific paging based at least in part on a recipient UE being stationary or supporting the beam-specific paging.

Aspect 44: An apparatus for wireless communication at a device, comprising a processor; memory coupled with the processor; and instructions stored in the memory and executable by the processor to cause the apparatus to perform the method of one or more of Aspects 1-43.

Aspect 45: A device for wireless communication, comprising a memory and one or more processors coupled to the memory, the one or more processors configured to perform the method of one or more of Aspects 1-43.

Aspect 46: An apparatus for wireless communication, comprising at least one means for performing the method of one or more of Aspects 1-43.

Aspect 47: A non-transitory computer-readable medium storing code for wireless communication, the code comprising instructions executable by a processor to perform the method of one or more of Aspects 1-43.

Aspect 48: A non-transitory computer-readable medium storing a set of instructions for wireless communication, the set of instructions comprising one or more instructions that, when executed by one or more processors of a device, cause the device to perform the method of one or more of Aspects 1-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising: one or more memories, and one or more processors; coupled to the one or more memories and configured to cause the UE to:

receive downlink assistance information relating to beam-specific paging;

transmit uplink assistance information relating to the beam-specific paging; and monitor for a paging message on one or more beams in accordance with at least one of the downlink assistance information or the uplink assistance information, wherein:

the downlink assistance information includes a request for the UE to provide information identifying a set of recommended beams or a set of restricted beams for the beam-specific paging, and the one or more processors, to cause the UE to transmit the uplink assistance information, are configured to cause the UE to transmit information identifying the set of recommended beams or the set of restricted beams for the beam-specific paging; or the downlink assistance information indicates a criterion for identifying the set of recommended beams or the set of restricted beams for the beam-specific paging; and the one or more processors are configured to cause the UE to identify the set of recommended beams or the set of restricted beams in accordance with the downlink assistance information; or the downlink assistance information indicates a criterion relating to at least one of a pool of beams or cells available for reselection, a pool of restricted beams or cells, a threshold for reselecting to a new beam, or timer information relating to reselection, wherein the one or more processors are configured to cause the UE to transmit information indicating a beam reselection based at least in part on the downlink assistance information; or the downlink assistance information indicates whether a cell supports the beam-specific paging, wherein the cell is a neighbor cell.

2. The apparatus of claim 1, wherein the one or more processors, to cause the UE to monitor for the paging message on one or more beams in accordance with at least one of the downlink assistance information or the uplink assistance information, are configured to cause the UE to monitor for the paging message in accordance with the downlink assistance information.

3. The apparatus of claim 1, wherein the one or more processors, to cause the UE to monitor for the paging message on one or more beams in accordance with at least one of the downlink assistance information or the uplink assistance information, are configured to cause the UE to monitor for the paging message in accordance with the uplink assistance information.

4. The apparatus of claim 1, wherein the uplink assistance information includes information identifying one or more recommended beams or one or more restricted beams for the beam-specific paging.

5. The apparatus of claim 1, wherein the uplink assistance information includes an indication that the UE will begin moving within a threshold period of time, and wherein the uplink assistance information includes an indication to disable the beam-specific paging.

6. The apparatus of claim 1, wherein the one or more processors, to cause the UE to transmit the uplink assistance information, are configured to cause the UE to transmit the uplink assistance information via a random access channel transmission or a small data transfer (SDT) transmission.

7. The apparatus of claim 1, wherein:

the downlink assistance information includes the request for the UE to provide information identifying the set of recommended beams or the set of restricted beams for the beam-specific paging; and the one or more processors, to cause the UE to transmit the uplink assistance information, are configured to cause the UE to transmit information identifying the set of recommended beams or the set of restricted beams for the beam-specific paging.

8. The apparatus of claim 1, wherein;

the downlink assistance information indicates the criterion for identifying the set of recommended beams or the set of restricted beams for the beam-specific paging; and the one or more processors are configured to cause the UE to identify the set of recommended beams or the set of restricted beams in accordance with the downlink assistance information.

9. The apparatus of claim 1, wherein:

the downlink assistance information indicates the criterion relating to at least one of the pool of beams or cells available for reselection, the pool of restricted beams or cells, the threshold for reselecting to the new beam, or timer information relating to reselection; and the one or more processors are configured to cause the UE to transmit information indicating the beam reselection based at least in part on the downlink assistance information.

10. The apparatus of claim 1, wherein the downlink assistance information indicates whether the cell supports the beam-specific paging, wherein the cell is the neighbor cell.

11. An apparatus for wireless communication at a network entity, comprising: one or more memories, and one or more processors, coupled to the one or more memories, and configured to cause the network entity to:

transmit downlink assistance information relating to beam-specific paging;

receive, from a user equipment (UE), uplink assistance information relating to the beam-specific paging; and output a paging message on one or more beams in accordance with at least one of the downlink assistance information or the uplink assistance information wherein:

the downlink assistance information includes a request for the UE to provide information identifying a set of recommended beams or a set of restricted beams for the beam-specific paging, and the one or more processors, to cause the network entity to receive the uplink assistance information, are configured to cause the network entity to receive information identifying the set of recommended beams or the set of restricted beams for the beam-specific paging; or the downlink assistance information indicates a criterion for identifying the set of recommended beams or the set of restricted beams for the beam-specific paging; or the downlink assistance information indicates a criterion relating to at least one of a pool of beams or cells available for reselection, a pool of restricted beams or cells, a threshold for reselecting to a new beam, or timer information relating to reselection, wherein the one or more processors are configured to cause the network entity to receive information indicating a beam reselection based at least in part on the downlink assistance information; or the downlink assistance information indicates whether a cell supports the beam-specific paging, wherein the cell is a neighbor cell.

12. The apparatus of claim 11, wherein:

the downlink assistance information includes the request for the UE to provide information identifying the set of recommended beams or the set of restricted beams for the beam-specific paging; and the one or more processors, to cause the network entity to receive the uplink assistance information, are configured to cause the network entity to receive information identifying the set of recommended beams or the set of restricted beams for the beam-specific paging.

13. The apparatus of claim 11, wherein:

the downlink assistance information indicates the criterion for identifying the set of recommended beams or the set of restricted beams for the beam-specific paging.

14. The apparatus of claim 11, wherein:

the downlink assistance information indicates the criterion relating to at least one of the pool of beams or cells available for reselection, the pool of restricted beams or cells, the threshold for reselecting to the new beam, or timer information relating to reselection; and the one or more processors are configured to cause the network entity to receive information indicating the beam reselection based at least in part on the downlink assistance information.

15. The apparatus of claim 11, wherein the downlink assistance information indicates whether the cell supports the beam-specific paging, wherein the cell is the neighbor cell.

16. A method of wireless communication performed by a user equipment (UE), comprising:

receiving downlink assistance information relating to beam-specific paging;

transmitting uplink assistance information relating to the beam-specific paging; and monitoring for a paging message on one or more beams in accordance with at least one of the downlink assistance information or the uplink assistance information wherein:

the downlink assistance information includes a request for the UE to provide information identifying a set of recommended beams or a set of restricted beams for the beam-specific paging, and the transmitting the uplink assistance information comprises transmitting information identifying the set of recommended beams or the set of restricted beams for the beam-specific paging; or the downlink assistance information indicates a criterion for identifying the set of recommended beams or the set of restricted beams for the beam-specific paging;

and the method comprises identifying the set of recommended beams or the set of restricted beams in accordance with the downlink assistance information; or the downlink assistance information indicates a criterion relating to at least one of a pool of beams or cells available for reselection, a pool of restricted beams or cells, a threshold for reselecting to a new beam, or timer information relating to reselection, wherein the method comprises transmitting information indicating a beam reselection based at least in part on the downlink assistance information; or the downlink assistance information indicates whether a cell supports the beam-specific paging, wherein the cell is a neighbor cell.

17. The method of claim 16, wherein monitoring for the paging message on one or more beams in accordance with at least one of the downlink assistance information or the uplink assistance information comprises monitoring for the paging message in accordance with the downlink assistance information.

18. The method of claim 16, wherein monitoring for the paging message on one or more beams in accordance with at least one of the downlink assistance information or the uplink assistance information comprises monitoring for the paging message in accordance with the uplink assistance information.

19. The method of claim 16, wherein the uplink assistance information includes information identifying one or more recommended beams or one or more restricted beams for the beam-specific paging.

20. The method of claim 16, wherein the uplink assistance information includes an indication that the UE will begin moving within a threshold period of time, and wherein the uplink assistance information includes an indication to disable the beam-specific paging.

21. The method of claim 16, wherein the method comprises transmitting the uplink assistance information, are configured to cause the UE to transmit the uplink assistance information via a random access channel transmission or a small data transfer (SDT) transmission.

22. The method of claim 16, wherein:

the downlink assistance information includes the request for the UE to provide information identifying the set of recommended beams or the set of restricted beams for the beam-specific paging; and the transmitting the uplink assistance information comprises transmitting information identifying the set of recommended beams or the set of restricted beams for the beam-specific paging.

23. The method of claim 16, wherein:

the downlink assistance information indicates the criterion for identifying the set of recommended beams or the set of restricted beams for the beam-specific paging; and the method comprises identifying the set of recommended beams or the set of restricted beams in accordance with the downlink assistance information.

24. The method of claim 16, wherein:

the downlink assistance information indicates the criterion relating to at least one of the pool of beams or cells available for reselection, the pool of restricted beams or cells, the threshold for reselecting to the new beam, or timer information relating to reselection; and the method comprises transmitting information indicating the beam reselection based at least in part on the downlink assistance information.

25. The method of claim 16, wherein the downlink assistance information indicates whether the cell supports the beam-specific paging, wherein the cell is the neighbor cell.

26. A method of wireless communication performed by a network entity, comprising:

transmitting downlink assistance information relating to beam-specific paging;

receiving, from a user equipment (UE), uplink assistance information relating to the beam-specific paging; and outputting a paging message on one or more beams in accordance with at least one of the downlink assistance information or the uplink assistance information, wherein:

the downlink assistance information includes a request for the UE to provide information identifying a set of recommended beams or a set of restricted beams for the beam-specific paging, and the receiving the uplink assistance information comprises receiving information identifying the set of recommended beams or the set of restricted beams for the beam-specific paging; or the downlink assistance information indicates a criterion for identifying the set of recommended beams or the set of restricted beams for the beam-specific paging; or the downlink assistance information indicates a criterion relating to at least one of a pool of beams or cells available for reselection, a pool of restricted beams or cells, a threshold for reselecting to a new beam, or timer information relating to reselection, wherein the method comprises receiving information indicating a beam reselection based at least in part on the downlink assistance information; or the downlink assistance information indicates whether a cell supports the beam-specific paging, wherein the cell is a neighbor cell.

27. The method of claim 26, wherein:

the downlink assistance information includes the request for the UE to provide information identifying the set of recommended beams or the set of restricted beams for the beam-specific paging; and the receiving the uplink assistance information comprises receiving information identifying the set of recommended beams or the set of restricted beams for the beam-specific paging.

28. The method of claim 26, wherein:

the downlink assistance information indicates the criterion for identifying the set of recommended beams or the set of restricted beams for the beam-specific paging.

29. The method of claim 26, wherein:

the downlink assistance information indicates the criterion relating to at least one of the pool of beams or cells available for reselection, the pool of restricted beams or cells, the threshold for reselecting to the new beam, or timer information relating to reselection; and the method comprises receiving information indicating the beam reselection based at least in part on the downlink assistance information.

30. The method of claim 26, wherein the downlink assistance information indicates whether the cell supports the beam-specific paging, wherein the cell is the neighbor cell.

* * * * *